United States Patent
Gianfelici et al.

(10) Patent No.: US 10,169,478 B2
(45) Date of Patent: Jan. 1, 2019

(54) OPTIMIZE DATA EXCHANGE FOR MVC-BASED WEB APPLICATIONS

(71) Applicant: International Business Machines Corporation, Armonk, NY (US)

(72) Inventors: Andrea Gianfelici, Rome (IT); Marco Lerro, Rome (IT); Vito Losacco, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 14/475,947

(22) Filed: Sep. 3, 2014

(65) Prior Publication Data

US 2015/0067157 A1    Mar. 5, 2015

Related U.S. Application Data

(63) Continuation of application No. 14/011,124, filed on Aug. 27, 2013.

(51) Int. Cl.
*H04L 29/08* (2006.01)
*G06F 17/30* (2006.01)

(52) U.S. Cl.
CPC ......... *G06F 17/3089* (2013.01); *H04L 67/02* (2013.01)

(58) Field of Classification Search
CPC .............................. G06F 17/3089; H04L 67/02
USPC ....................................................... 709/220
See application file for complete search history.

(56) References Cited

U.S. PATENT DOCUMENTS

| | | | |
|---|---|---|---|
| 5,490,088 A * | 2/1996 | Landis | ............. G06F 17/30067 707/999.001 |
| 6,243,761 B1 | 6/2001 | Mogul et al. | |
| 6,442,748 B1 | 8/2002 | Bowman-Amuah | |
| 6,593,944 B1 | 7/2003 | Nicolas et al. | |
| 6,715,145 B1 | 3/2004 | Bowman-Amuah | |
| 6,742,015 B1 | 5/2004 | Bowman-Amuah | |
| 7,225,249 B1 | 5/2007 | Barry et al. | |
| 7,640,512 B1 | 12/2009 | Appling | |
| 7,934,191 B2 | 4/2011 | Yassin | |
| 9,021,348 B1 | 4/2015 | Meschkat et al. | |
| 9,026,903 B1 | 5/2015 | Michael et al. | |
| 2002/0069204 A1 | 6/2002 | Kahn et al. | |
| 2003/0145305 A1 | 7/2003 | Ruggier | |
| 2004/0046789 A1 | 3/2004 | Inanoria | |
| 2005/0216421 A1 | 9/2005 | Barry et al. | |

(Continued)

FOREIGN PATENT DOCUMENTS

| | | |
|---|---|---|
| CN | 101232505 B | 7/2012 |
| CN | 102830973 A | 12/2012 |
| KR | 1020080109361 A | 12/2008 |

OTHER PUBLICATIONS

Klensin et al., RFC 1870, Nov. 1995, IETF (10 pages).*
Wikipedia, Document comparison, archived Jul. 29, 2013 (4 pages).*
Chava et al., "Cost-aware Mobile Web Browsing", IEEE Pervasive Computing, 2012, cs.nyu.edu, 8 pages.

(Continued)

*Primary Examiner* — Wing F Chan
*Assistant Examiner* — Leon Y Tseng
(74) *Attorney, Agent, or Firm* — Gilbert Harmon, Jr.

(57) ABSTRACT

Embodiments of the present invention disclose a method, computer program product, and system for reducing network traffic. In one embodiment, a computer determines that a webpage has changed and that an amount of data to be transmitted to update the portion of the webpage that has changed is smaller than an amount of data to be transmitted to update the entire webpage.

6 Claims, 8 Drawing Sheets

(56) References Cited

U.S. PATENT DOCUMENTS

| | | |
|---|---|---|
| 2006/0195779 A1* | 8/2006 | McElroy ............ G06F 17/2247 715/204 |
| 2007/0100844 A1 | 5/2007 | Buttner et al. |
| 2007/0220106 A1 | 9/2007 | Reisman |
| 2008/0263179 A1 | 10/2008 | Buttner et al. |
| 2009/0049120 A1 | 2/2009 | Sakairi et al. |
| 2010/0306366 A1 | 12/2010 | Cragun et al. |
| 2011/0161400 A1 | 6/2011 | Silyaev et al. |
| 2011/0246460 A1 | 10/2011 | Hsieh et al. |
| 2011/0246528 A1 | 10/2011 | Hsieh et al. |
| 2011/0246826 A1 | 10/2011 | Hsieh et al. |
| 2011/0321010 A1 | 12/2011 | Wang |
| 2012/0084346 A1 | 4/2012 | Mickens |
| 2012/0254292 A1 | 10/2012 | Newton et al. |
| 2013/0185337 A1 | 7/2013 | Lipcon |
| 2013/0204948 A1 | 8/2013 | Zeyliger et al. |
| 2013/0254740 A1 | 9/2013 | Swaminathan et al. |

OTHER PUBLICATIONS

Housel et al., "WebExpress: a client/intercept based system for optimizing Web browsing in a wireless environment", Mobile Networks and Applications 3 (1998), pp. 419-431.

Khoury et al., "An Efficient Web Page Change Detection System Based on an Optimized Hungarian Algorithm", IEEE vol. 19, No. 5, May 2007, pp. 599-613.

Zhang, Dongsong, "Web Content Adaptation for Mobile Handheld Devices", Communications of the ACM, Feb. 2007, vol. 50, No. 2, pp. 75-79.

IBM Appendix P, list of patents or patent applications treated as related, Nov. 11, 2017, 2 pages.

Lazetic, et al.; "A Generator of MVC-based Web Applications"; World of Computer Science and Information Technology Journal (WCSIT); ISSN: 2221-07841; vol. 2; No. 4; pp. 147-156; 2012.

"Model-view-controller"; Wikipedia; Printed Apr. 8, 2013; <http://en.wikipedia.org/wiki/Model-view-controller>.

Gianfelici et al., "Optimize Data Exchange for MVC-Based Web Applications", U.S. Appl. No. 14/011,124, filed Aug. 27, 2013.

* cited by examiner

DETAILED COMPONENT DIAGRAM

Parameters

| | |
|---|---|
| changedcomponentid | mx762 |
| changedcomponentvalue | 045 |
| currentfocus | mx781 |
| debugdock | left |
| event | setvalue |
| hiddenframe | true |
| scrollleftpos | 0 |
| scrolltoppos | 0 |
| targetid | mx762 |
| uisessionid | 2 |
| value | 045 |
| vischangedcomponentvalue | 045 |

Source hiddenframe=true&event=setvalue&targetid=mx762&value=045&changedcomponentid=mx762&vischangedcomponentvalue=045&changedcomponentvalue=045&currentfocus=mx781&scrollleftpos=0&scrolltoppos=0&debugdock=left&uisessionid=2

FIG. 5

```
<section border="true"id="main_gridd">
-<sectionrow id="main_gridg">
-<sectioncol id="main_gride"/>
-<section id="main_gridf">
<multiparttextbox dataattribute="ITEMNUM" descdataattribute="DESCRIPTION"id="main_grid2_1"longdescription="true"menutype="item"/>
<textbox dataattribute="modello"id="copy_copy_main_grid3_5"label="Modello"lookup="valuelist"/>
<multiparttextbox dataattribute=ornres"descdataattribute="ORNRES-VALDESCRIPTION"descinputnode="READONLY"id="main_grid2_3"
longdescreadonly="true"lookup="com"/>
<textbox dataattribute="ITEMSETID"id="main_grid2_2"/>
<multiparttextbox dataattribute="COMMODITYGROUP"descdataattribute="COMMODITYGROUPDESCRIPTION"descinputmode="readonly"
id="main_grid2_3"longdescreadonly="true"lookup="com/>
<multiparttextbox dataattribute="COMMODITY"descdataattribute="COMMODITIESDESCRIPTION" descinputmode="readonly"id="main_grid2_4"
longdescreadonly="true"lookup="commodities"/>
```

FIG. 6

⊟ <tr id-"mx769_0" class=" leafspacer" style="vertical-align:top;" control="true">
   ⊞ <td id="mx768_0" align="right" valign="m iddle" nowrap="nowrap" style="vertical-align:middle;">
   ⊟ <td id="mx768_1" valign="middle" nowrap= "nowrap" style="vertical-align:middle;">
      ⊞ <div id="mx761_compHolder" class="bc" st yle="dtsplay:inline;" vis="true" needsre fresh="false" nowrap="">
      ⊟ <div id="mx762_compHolder" class="bc" st yle="display:inline;" vis="true" needsre fresh="false" nowrap="">

⟶ | <input id="mx762" class="text text ib" type="text" style=";" size="10" maxl ength="3" title="Gruppo INRES" value="" li="mx763" ctype="textbox x">

FIG. 7

OPTIMIZE DATA EXCHANGE FOR MVC-BASED WEB APPLICATIONS

FIELD OF THE INVENTION

The present invention relates generally to the field of software development, and more particularly to client-server application development.

BACKGROUND OF THE INVENTION

The model-view-controller (MVC) design pattern assigns objects in an application one of three roles: (i) model, (ii) view, or (iii) controller. The design pattern defines the roles objects play in the application and the way objects communicate with each other. Each of the three types of objects is separated from the others by abstract boundaries. One way to easily envision MVC is as follows: (i) the model object is the data; (ii) the view object is the window on the screen; and (iii) the controller object is the glue between the two. Several enterprise web applications running on multi-tier level architectures implement the MVC design pattern where the view layer is usually placed on the server-side. Such an implementation was preferred in the past because the processors lacked power to host view logic. Over the years, the vast improvements in processor performance have opened opportunities to split the implementation between client and servers. Such opportunities for new solutions increase both usability and performance.

Model objects, in a MVC architecture, encapsulate data specific to an application. Model objects encapsulate the logic to manipulate and process data. Model objects usually represent concrete items, such as a contact in a phone's address book.

A view object, or known simply as a view, is an object in an application that users can observe. Two major purposes of view objects are to display data from the application's model objects and to enable the editing of that data. A view object knows how to draw itself. A view object can respond to user actions. A view for a contact in a phone's address book would know how to display the contact and allow editing of it.

A controller object acts as an in-between from one or more of an application's view objects to one or more of its model objects; they are conduits. A controller object interprets user's actions made within view objects and communicates new or updated data to the model layer.

SUMMARY

Embodiments of the present invention disclose a method, computer program product, and system for reducing network traffic. The method comprises a first computer receiving a request for an update for a webpage from a second computer. The first computer determines a portion of the webpage that has changed. The first computer determines that an amount of data to be transmitted to update the portion of the webpage that has changed is smaller in size than an amount of data to be transmitted to update the entire webpage.

BRIEF DESCRIPTION OF THE SEVERAL VIEWS OF THE DRAWINGS

FIG. 5 is a listing of attributes and values that reflect a user's action on business data in accordance with an illustrative embodiment of the present invention.

FIG. 6 lists extendable markup language (XML) representation for a multi-part textbox, as in accordance with an embodiment of the present invention.

FIG. 7 shows rendered content for a browser at run-time, as in accordance with an embodiment of the present invention.

DETAILED DESCRIPTION

Figure 1:
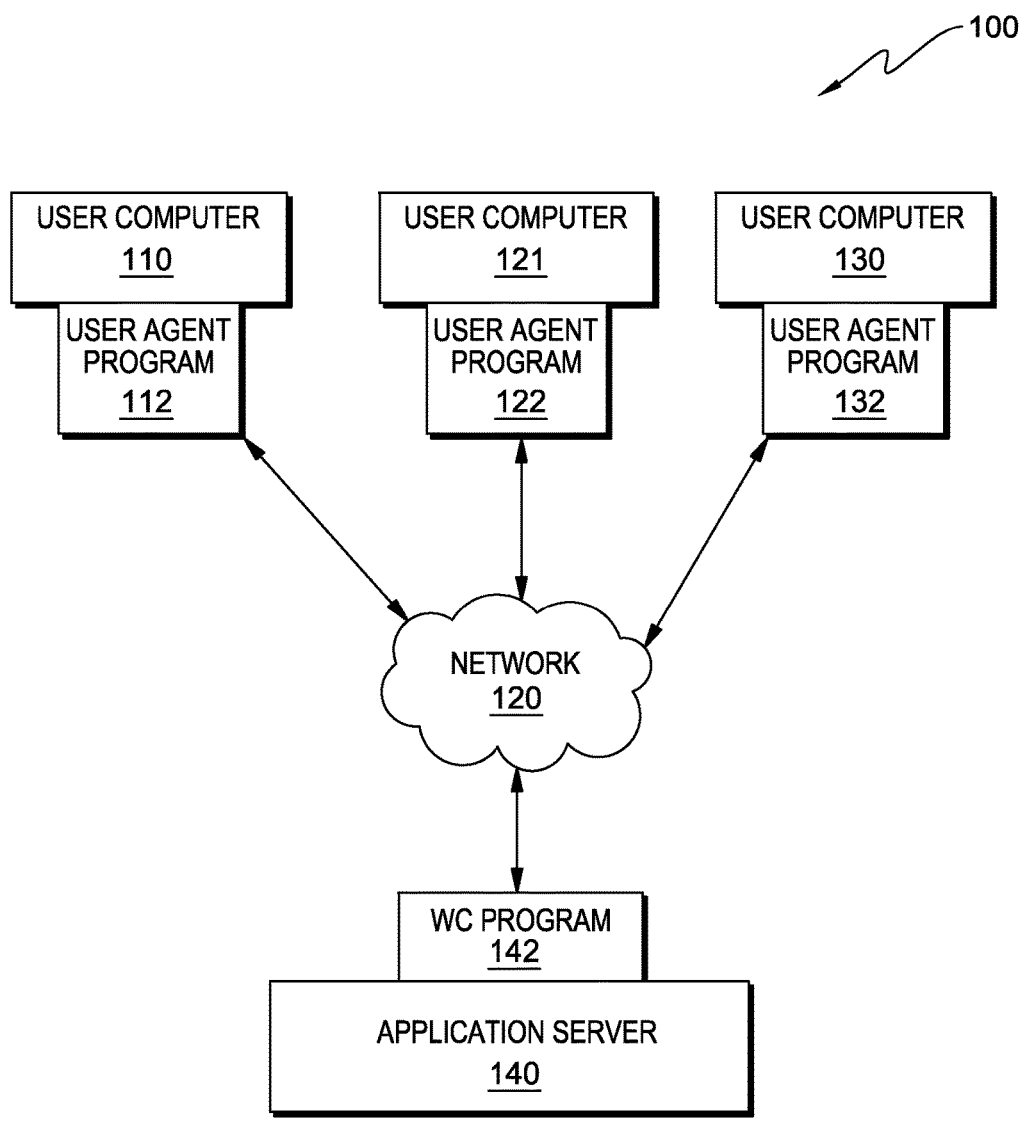
FIG. 1 depicts distributed data processing system 100 in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but is not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but is not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

FIG. 1 depicts distributed data processing system 100 in accordance with one embodiment of the present invention. Distributed data processing system 100 includes user computer 110, user computer 121, user computer 130 and application server 140, all interconnected over network 120. User computers 110, 121, and 130, and application server 140 may each include components as depicted in further detail with respect to FIG. 3. Distributed data processing system 100 may include additional servers, or other devices not shown.

Network 120 may be a local area network (LAN), a wide area network (WAN) such as the Internet, any combination thereof, or any combination of connections and protocols that will support communications between user computers 110, 121, and 130, and application server 140 in accordance with embodiments of the invention. Network 120 may include wired, wireless, or fiber optic connections.

User computers 110, 121, and 130 may be desktop computers, notebooks, laptop computers, tablet computers, handheld devices, smart-phones, thin clients, or any other electronic devices capable of requesting and receiving information from a server computer, such as application server 140. User computer 110, 121, and 130 include user agent 112, 122, and 132, respectively.

User agent programs 112, 122, and 132 are software applications capable of requesting information from a server computer. User agent programs 112, 122, and 132 add additional information to the request. The additional information includes details about the user action and about the graphical controls that are involved in the request. For example, a user can request information on airline reservations. The user will use the graphical controls provided on the webpage, such as text boxes, dropdown boxes, combo boxes, and alike, to enter pertinent information. The user action, in this example, is the submittal of that information to an airline reservation database in the form of a request. Requests are in the form of a communication protocol, such as hypertext transfer protocol (HTTP).

Application server 140 may be a management server, a web server, or any other electronic device or computing system capable of receiving and sending data, and communicating with other devices, such as user computer 110, user computer 121, and user computer 130, via network 120. In other embodiments, application server 140 may represent a server computing system utilizing multiple computers as a server system, such as in a cloud computing environment. Additionally, application server 140 may perform other conventional services, not shown in FIG. 1, that include, but is not limited to: (i) web page delivery; (ii) mail server; (iii) print server; and (iv) gaming server.

Application server 140 contains WC program 142 and a communications manager. The communication manager facilitates application programs to interact with each connection type on a consistent and predictable manner. The communication manager isolates the implementation details of the different connection types from the application programs, such as WC program 142. In one embodiment, the connection manager enables software, such as WC program 142, to send or receive files using hypertext transfer protocol. A connection is analogous to a word processing program connecting to a printer to print a document.

WC program 142 is software capable of analyzing and producing an optimized response to a request from a client. An optimized response (sometimes referred to as an optimized view) is one that attempts to produce less network traffic than the normal traffic that is generated without executing WC program 142 (a non-optimized view). Both the optimized view and the non-optimized view contain information on the website content that has changed. Both the optimized view and the non-optimized view contain information on the website content that has not changed, however the optimized view determines how to package the information differently from the non-optimized view to possible create less traffic differently from the non-optimized view. WC program 142 determines the view that would generate the least amount of network traffic by determining which view is less, the optimized view or the non-optimized view. WC program 142 receives the data (the user request) and creates a response containing information on the aspects of the webpage that has changed, plus information about the portion of the webpage that remains the same. More specifically, WC program 142 optimizes a response by exploiting the following data: (i) request data, such as, changed user-control, next focus; (ii) business-logic information, such as, meta-data, runtime information; and (iii) request response history. Additionally, WC program 142 is also capable of inspecting client requests to determine the content and the target of the user interaction, for example a combo-box selection. Client requests are routed to the normal flow. WC program 142 works in concert with user agent programs 112, 122, and 132.

The development of web infrastructures over the last several years has produced powerful browsers. This condition triggered a transformation of web based architectures by moving a portion of the business logic closer to the user interface (UI) presentation and therefore towards the clients. The great benefit of such a shift is in distributing the load onto the clients, thus reducing loads on the server and reducing network latency issues. Embodiments of the invention recognize that applying such transformation to legacy architectures, usually based on the MVC pattern, is difficult. Embodiments of the invention provide an architecture, which allows MVC based architectures to gain benefits in a transparent way. Embodiments of the invention provide an intermediate layer, which allows efficiency without changes to the legacy architectures.

Figure 2:
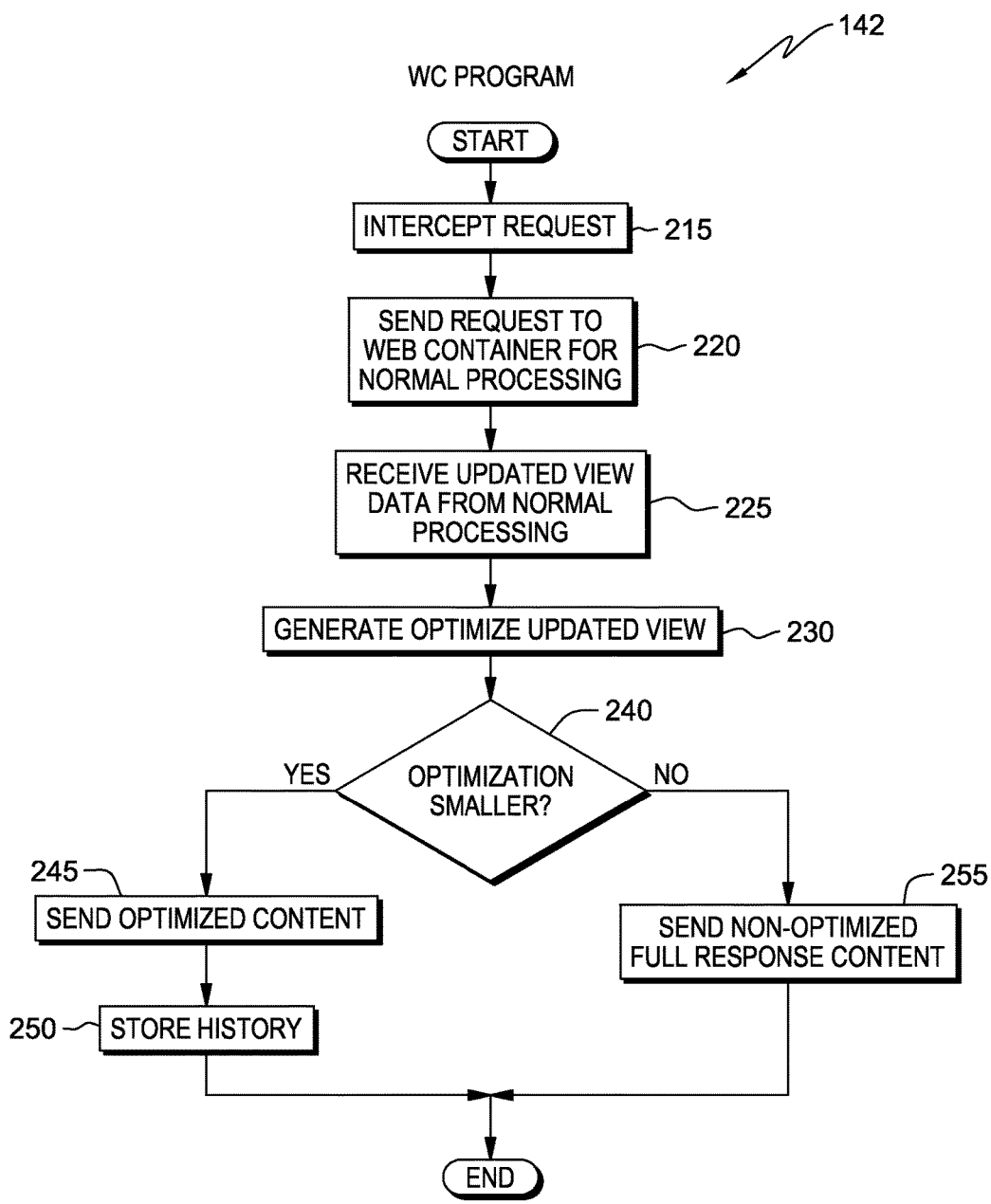
FIG. 2 is a flowchart depicting operational steps of a web container (WC) module in accordance with one embodiment of the present invention.

FIG. 2 is a flowchart depicting operational steps of WC program 142 in accordance with one embodiment of the present invention.

In one embodiment, initially, the user interacts with user computer 110 and triggers an event within an application. An event triggers a request to update webpage data. Such requests may be in the form of hypertext transfer protocol (HTTP). An event includes, but certainly not limited to: (i) changing a value in the user's entry object, such as changing text in a text box; (ii) a button request, such as the user pressing a soft-button; (iii) selecting a value from a value list; (iv) opening a dialog; (v) tabbing from one field to another; and (vi) any user interaction with the web browser which causes the server to analyze it and produce a new hypertext markup language (HTML) response to reflect the user action. For example, in an airline reservation system a user may use a dropdown box to choose the city of destination. This can trigger an event (a request) to update the webpage with airline flights to the destination.

The user agent program 112 inserts details in the request relating to the user action and the graphical control. MVC implementations map UI controls with IDs which in turn are mapped to the business data. In the aforementioned airline reservation example, the UI control is setting a dropdown box graphic control (using a setvalue event) to a destination city. In one embodiment, the ID is mx762, which labels the specific dropdown box in which the destination city is set. The user agent program 112 provides enough details to embodiments of the present invention to determine changes in the user's view. For example, a user of a view fills four text boxes. Each time a text box is filled, and focus is moved away from the filled text box, a UA program, such as user agent program 112, sends a request to the server to get the updated view for presentation to the user. In this case, the user of the view eventually fills all four text boxes, and consequently, the UA program produces four requests.

User agent 112 program sends the request to application server 140 for servicing. Without any further action from the user, which would generate another request, user agent program 112 awaits a service response from application server 140.

In step 215, WC program 142 receives requests from user agent program 112. WC program 142 extracts relevant information from the request and is subsequently stored. The relevant information can be stored in any memory, including on or off application server 140, as long as, the memory provides data integrity and is accessible, such as computer-readable storage medium, formerly discussed. Relevant information includes, but is not limited to: (i) the graphical control identification that generated the event; (ii) the generated event; and (iii) attributes associated with the generated event, such as, a value is given to an attribute of a "set value" event. In some embodiments, the information grabbed from the request is used to efficiently produce the optimized response. In some embodiments, specific optimization patterns could be implemented by simply leveraging parameters in the request, based on the MVC implementation being optimized. Such specific optimization patterns relate to user events. In such cases where there are no changes to business data, however, there are changes that affect the presentation. For instance, a user clicks on a calendar show button. Some embodiments will have the following parameters: control_id=calendar_xxx, action=show_calendar_popup. The current view would be enriched by the presentation of the calendar pop-up. The extraction of such delta from the canonical response is optimized depending on the specific scenario. For example the extraction of the calendar representation can be implemented looking at specific pieces in the response using the calendar control id.

In step 220, WC program 142 forwards the request to a web container for normal processing. Normal processing updates the old view (a view, as some form of visualization of the state of the model) with new information which can include, but not limited to: (i) business logic updates, possibly using a database; (ii) controls, such as drop down; and (iii) any other presentation elements or controls, mixed by the MVC schema, to produce the updated view.

In step 225, WC program 142 may receive the updated view from a business application. Business applications are software applications that utilize databases for specific purposes, for example engineering data or economic models, library systems, flight reservation systems, and computerized parts inventory systems. One example of the business application is the airline reservation example previously discussed. The business application is generating a full updated view of the webpage.

In step 230, WC program 142 generates a view that is optimized. An optimized view is a view that would generate less network traffic. WC program 142 analyzes objects that contribute to the updated view. Objects are collections of data structured in a predefined manner. Objects hold data and routines that operating on that data. WC program 142 collects and analyzes the changed attributes associated with each of the objects. More specifically, WC program 142 compares the list of changed attributes with the history of changes collected in the past. Keeping the history allows WC program 142 to determine the differences between the old view and the updated view. An example of an object is a dropdown box. Both the optimized view and the non-optimized view contain information on the website content that has changed. Both the optimized view and the non-optimized view contain information on the website content that has not changed, however the optimized view determines how to package the information differently from the non-optimized view to possible create less traffic differently from the non-optimized view. A view that contains 100 dropdown boxes (100 objects that correspond to 100 dropdown boxes) in which only one dropdown box is changed (99 dropdown boxes remain the unchanged), the optimized view would only contain information on the one changed dropdown, while the non-optimized full view would contain information on the 100 dropdown boxes. Each time an attribute (linked to a dropdown box) changes WC program 142 simply provides the associated modified dropdown box presentation. WC program 142 does not send updates related to previously unchanged dropdown boxes. In order to determine what has changed in the current request, a comparison is performed between changes in the previous steps and the current changes. In such a comparison, WC program 142 determines that only a dropdown box data has changed, therefore sending only an optimal data response back to the appropriate UA program. In the aforementioned airline reservation example, a destination city was entered into a dropdown box. Given this information WC program 142 returns flight information associated with the destination city. However, any information that was entered previously on the webpage and remains intact will not be returned; as there is no need to generate network traffic for non-changing webpage data. For instance, if a date of travel was entered before the destination city was entered, there is no need to return the date of travel information as the date of travel did not change.

Detailing the above embodiment is as follows. WC program 142 starts from a complete view, produced by the request at time t0. Following requests at time t1, t2, and so on, until tN, WC program 142 builds partial views (known as deltas), until the optimized is complete. In other words, starting from the complete response collected at time t0, the WC program 142 produces the optimized response at time tN. Different embodiments of WC program 142 may utilize different strategies to produce the optimized response. Examples of two strategies include, but are not limited to: (i) extract differences from a complete response at t0, or (ii) extract differences from response at time tN−1 for data actually changed from time tN−1. One embodiment to implement the second choice is to provide a history of changed from time t0 to tN−1.

In decision step 240, WC program 142 determines which view to send to user agent program 112. The optimized view is compared to the non-optimized view (normal view) in order to determine which would generate the least amount of network traffic. Both the optimized view and the non-optimized view contain information on the website content that has changed. Both the optimized view and the non-optimized view contain information on the website content that has not changed, however the optimized view determines how to package the information differently from the non-optimized view to possible create less traffic differently from the non-optimized view. There are times the optimized view produces little benefit, and may even add content data, such as meta-data, that would increase the transmission. The comparison determines which view generates the least amount of data and consequently the least amount of network traffic. The view that generates less network traffic is sent to the appropriate user agent, such as user agent program 112. The increase in optimized view size is the results of adding additional information for the appropriate UA program to correctly manage the missing information. When a webpage page substantially changes program WC program 142 would need to send a significant amount of information for the appropriate UA program to manage all the changed objects.

In step 245, WC program 142, depending upon step 240, sends the optimized content to user agent program 112.

In step 250, WC program 142, depending upon step 240, stores the updated history records. When WC program 142 determines to send the non-optimized view the history is refreshed with the new non-optimized view to prepare for future comparisons. The history records can be stored in any memory, on or off the application server 140, as long as the memory provides data integrity and is accessible, such as computer-readable storage medium, formerly described.

In step 255, WC program 142, depending upon step 240, sends the non-optimized content to user agent program 112.

User agent program 112 receives the view content sent from WC program 142 and updates the user's presentation data, accordingly. Returning to the aforementioned airline reservation example, user agent program 112 receives the view content containing information on destination city plus information about the portion of the webpage that remains the same, such as date of travel. User agent program 112 communicates with the document object model (DOM) application programming interface (which possess software to update webpages using hypertext markup language) on how to display the destination city plus date of travel. The view will be either the optimized view or the non-optimized view. User agent program 112 contains the software to construct a view for display, for the DOM, that would be identical to a non-optimized view. Whenever an optimized view is received user agent program 112 constructs a view for display using the DOM. Whenever a non-optimized view is received user agent program 112 can pass the non-optimized view to the DOM with minimal manipulation. In one embodiment, user agent program 112 works in concert with a web browser to display the view received from WC program 142.

Figure 3:
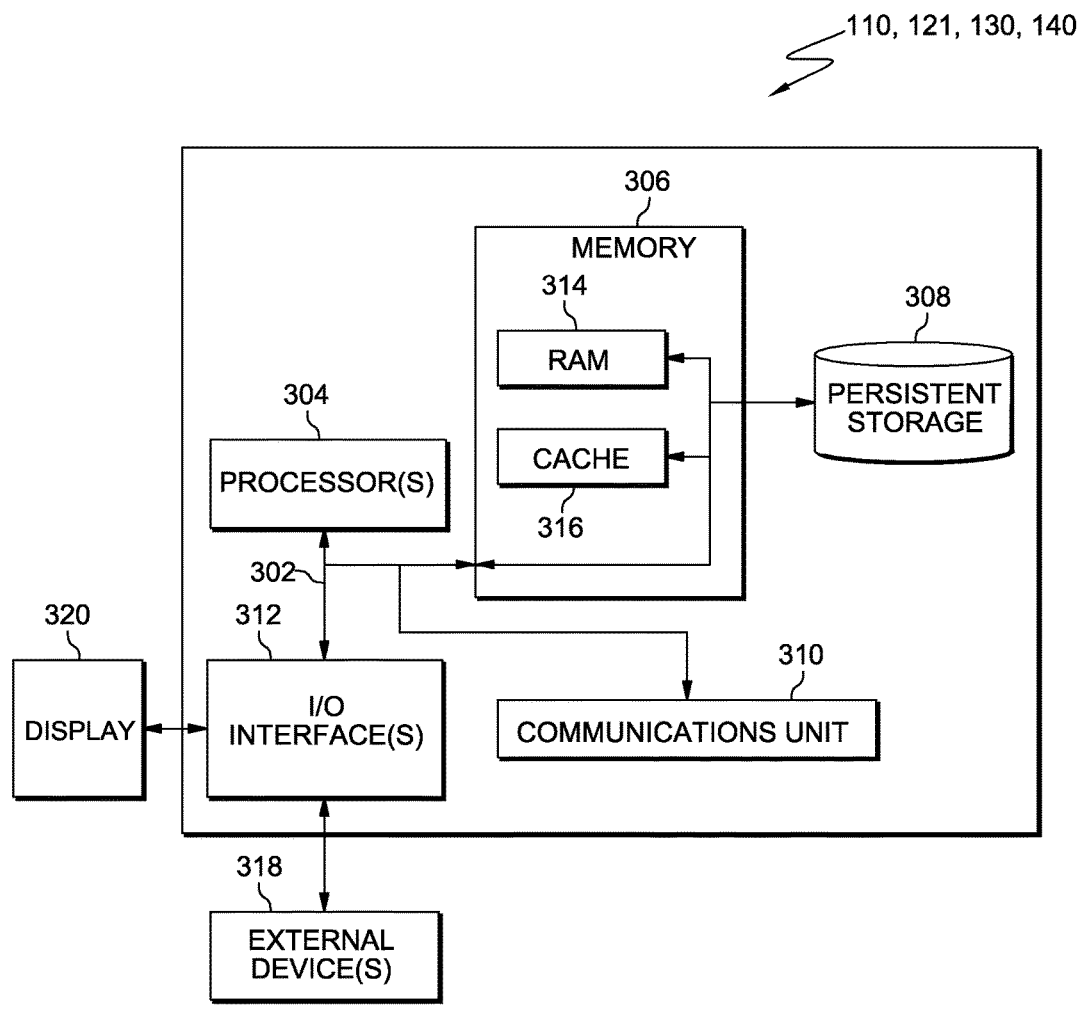
FIG. 3 depicts a block diagram of components of user computers and application server computer, as in accordance with an illustrative embodiment of the present invention

FIG. 3 depicts a block diagram of components of user computers 110, 121, 130, and application server 140, as in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Distributed data processing environment computers include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

WC program 142 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that are capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of enterprise grid (not shown) and distributed data processing environment computers. In these examples, communications unit 310 includes one or more network interface cards. Communications unit 310 may provide communications through the use of either or both physical and wireless communications links. WC program 142 may be downloaded to persistent storage 308 of application server 140 through communications unit 310 of application server 140.

I/O interface(s) 312 allows for input and output of data with other devices that may be connected to distributed data processing environment computers. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g. WC program 142, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

Now that the embodiment(s) of FIGS. 1 to 3 have been fully discussed, some additional discussion and embodiments of the present invention will be discussed in the following paragraphs.

Figure 4:
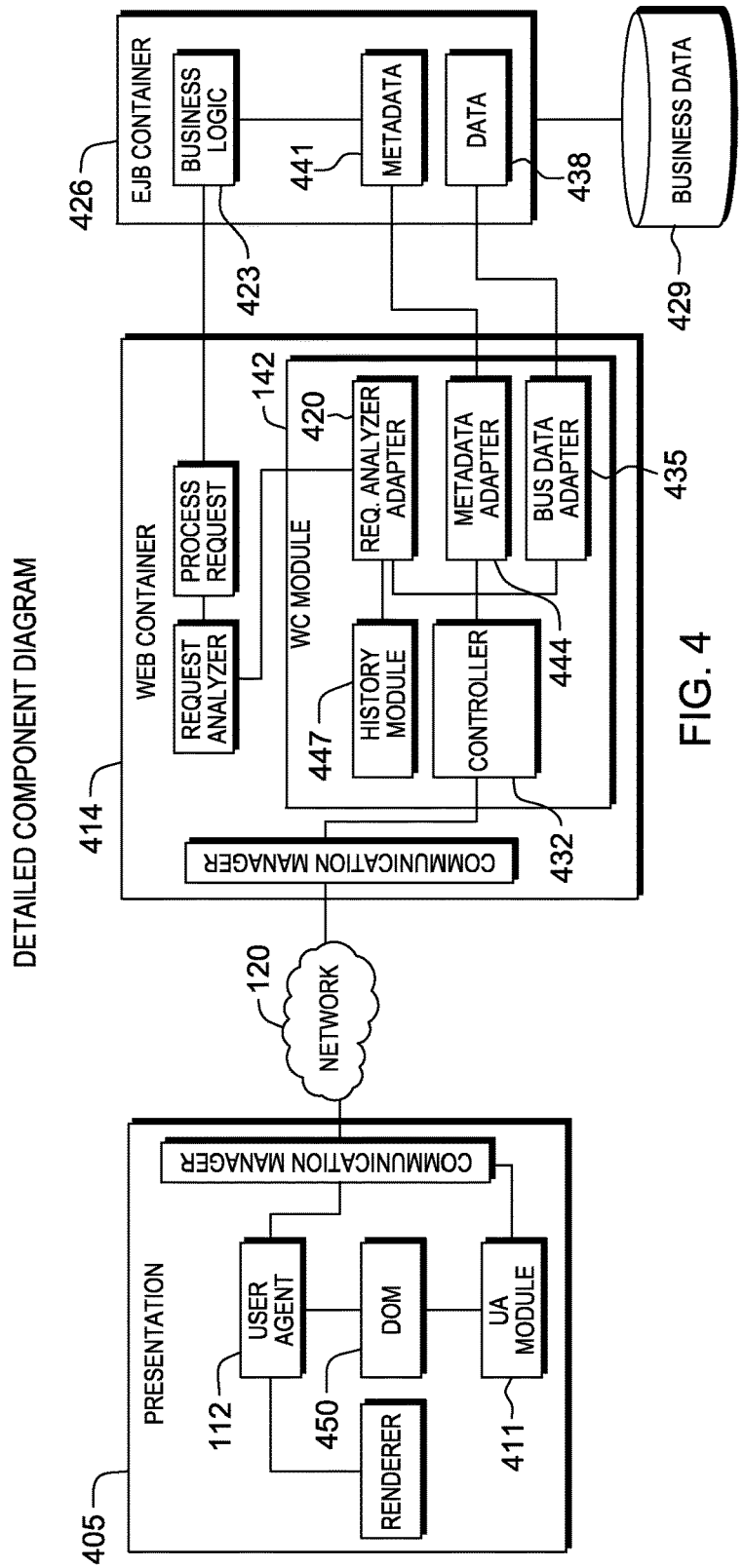
FIG. 4 depicts a block diagram of the components of a user agent program and a WC program, as in accordance with an illustrative embodiment of the present invention.

FIG. 4 depicts a block diagram of the components of user agent program 112 and WC program 142, as in accordance with an illustrative embodiment of the present invention.

The user interacts with user interface 405, thus triggering an action, by changing values: (i) editing value inside a text box; (ii) invoking a command, for example clicking a button; or (iii) any typical user action that invokes a change in the user's presentation. User agent program 112 produces a request inserting details about the user action and about the graphical controls that are involved. User agent program 112 sends a request, one such request is in the form of a hypertext transfer protocol (HTTP) request, to web container 414. When the user agent program 112 initiates a request UA module 411 intercepts the request, forwards it to web container 414, and waits for a response from WC program 142.

WC program 142 intercepts the request coming from UA module 411.

Request analyzer adapter 420 grabs relevant information from the request and temporary stores the relevant information, which includes, but not limited to: (i) the graphical control identification which generated the event; (ii) the generated event; and (iii) specific event's attributes (e.g. for a typical "set value" event the attribute is the value set by the user). Request analyzer adapter 420 forwards the request to the web container 414.

Business logic 423 running within the EJB container 426 is executed. Business data 429 is potentially changed due to the executed business logic 423. The new view based on the updated business data 429 is produced by business logic 423.

WC program 142 optimizes response. Request analyzer adapter 420 gets the view. Controller 432 analyzes objects which contribute to the view content. For each object data 438 and metadata 441 is queried through business data adapter 435 and metadata adapter 444 to get changed attributes. Controller 432 retrieves the list of changed attributes. In order to figure out what is actually changed during the current request, controller 432 compares the whole list of changed attributes (since the last commit) with the history of changes collected in the past through history module 447. Controller 432 figures out the attributes actually changed in the current interaction. When the results of a number of changes for a response greater than the original entire view, the updated view is transmitted. Controller 432 extracts the "view" chunks that have been changed. Controller 432 evaluates how many attributes have been changed. Controller 432 evaluates how big are the fragments (to be sent) compared the entire view. History module 447 updates the history by storing the attributes changed during this request. If the changes are being committed the history is cleaned-up. WC program 142 packs the response. When the response can be optimized: (i) metadata adapter 444 reverse maps the attributes to their presentation id; (ii) controller 432 creates a response by providing a list of couples composed of the graphic control id and the view fragment; and (iii) WC program 142 sends back the response. When the response cannot be optimized WC program 142 sends back the entire view.

UA module 411 receives the response. When the response is optimized UA module 411 iterates the list of couples and updated the document object model (DOM) 450, accordingly; otherwise, UA module 411 updates the entire view.

FIG. 5 is a listing of attributes and values that reflect a user's action on business data in accordance with an illustrative embodiment of the present invention.

The user interacts with the user-agent and triggers an event which produces a request, one such request is in the form of hypertext transfer protocol (HTTP). The request contains detailed information about the control, such as attributes (parameters) and associated values, which lets the server to reflect user action on business data. For example, the attributes listed show the info sent to an application framework when setting a value to a text-box control.

FIG. 6 lists extendable markup language (XML) representation for a multi-part textbox, as in accordance with an embodiment of the present invention.

An application framework allows the definition of application layouts, usually through an XML representation which defines both view structure and binding to underlined data. Such definition contains a unique id for the text-box control (id="new_multiparttextbox") and a binding to the underlying object attribute (dataattribute="grinres").

FIG. 7 shows rendered content for a browser at run-time, as in accordance with an embodiment of the present invention.

The input HTML tag is identified by its unique run-time id (id="mx762") which is server-side mapped with the application definition id (id="new_multiparttextbox"). When the browser sends a request, it refers to the run-time id (id="mx762) which will be mapped by the server framework to the application definition id (id="new_multiparttextbox"). At this point is possible to get the bound attribute (dataattribute="grinres") and run the business-logic actions.

Figure 8:
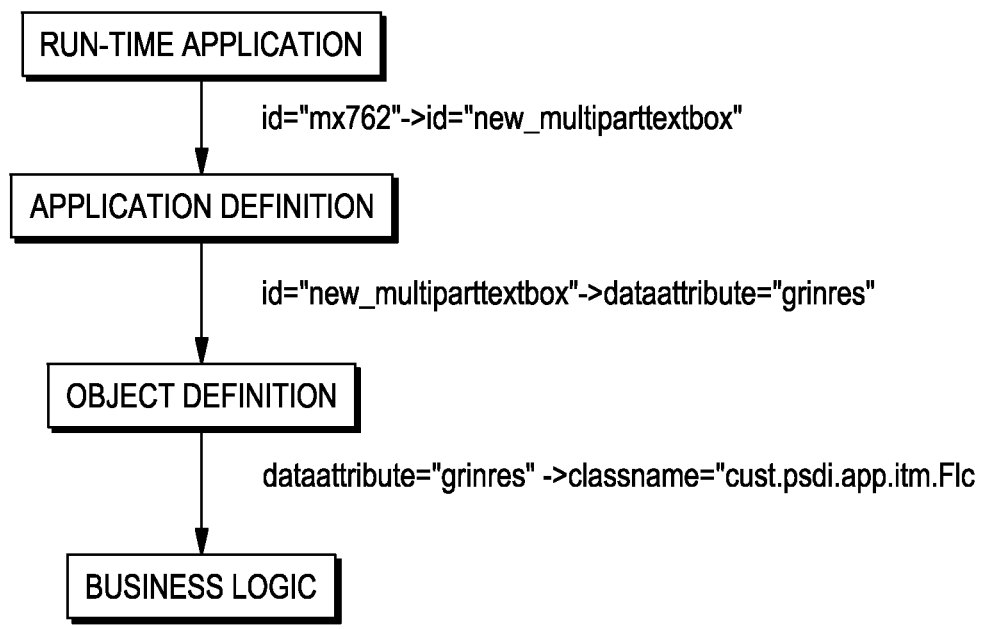
FIG. 8 shows the mapping process, as in accordance with an embodiment of the present invention.

FIG. 8 shows the mapping process, as in accordance with an embodiment of the present invention. The process to get deltas is based on the following data-structures: (i) request info details: the id of the user-agent control is used to figure-out who is triggering the change; (ii) business-data: the underling objects are evaluated to figure-out what has been changed by the server-side frame-work; (iii) framework metadata: based on what has been changed on the business-data, a reverse look-up up to the run-time application is done to understand what potentially has been changed; and (iv) request/response history: the history is leveraged to figure out changes that have been already managed in previous interaction which do not need to be re-sent.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for reducing network traffic when updating a web page, the method comprising the steps of:

receiving, by a first computer, a Hypertext Transfer Protocol (HTTP) request for an update for a webpage from a second computer;

determining, by the first computer, a portion of the webpage has changed;

determining, by the first computer, that an amount of data to be transmitted to update the portion of the webpage that has changed is smaller in size than an amount of data to be transmitted to update the entire webpage;

responsive to determining the amount of data to update the portion of the webpage that has changed is smaller than the amount of data to update the entire webpage, transmitting, by the first computer, to the second computer the amount of Hypertext Markup language (HTML) data to update the portion of the webpage that has changed wherein the portion of the webpage that has changed is identified based on a server framework mapping one or more unique runtime identifiers associated with one or more input HTML tags to an application definition identifier; and responsive to determining the amount of data to update the entire webpage is smaller than the amount of data to update the portion of the webpage that has changed, transmitting, by the first computer, to the second computer the amount of HTML data to update the entire webpage.

2. The method of claim 1, wherein the step determining that the amount of data to be transmitted to update the portion of the webpage that has changed is smaller in size than the amount of data to be transmitted to update the entire webpage comprises the steps of:

generating, by the first computer, a webpage data that represents the portion of the webpage that has changed;

determining, by the first computer, an amount of network traffic that the webpage data will generate when sent to the second computer;

comparing, by the first computer, the amount of network traffic that the webpage data generates to the amount of data to be transmitted to update the entire webpage.

3. The method of claim 2, wherein the step of generating the webpage data that represents the portion of the webpage that has changed further comprises analyzing changed attributes which contribute to the update of the webpage data.

4. The method of claim 2, wherein the step of generating the webpage data that represents the portion of the webpage that has changed further comprises adding additional information that describes the portion of the webpage that is unchanged.

5. The method of claim 1, further comprising creating a history that includes changes of the portion of the webpage that has changed.

6. The method of claim 1, further comprising comparing a history with changes of the portion of the webpage that has changed.

* * * * *